(12) United States Patent
Hiruma

(10) Patent No.: US 6,662,082 B2
(45) Date of Patent: Dec. 9, 2003

(54) SYSTEM FOR OPERATING A ROBOT WITH EASY PROGRAMMING

(75) Inventor: Kenichiro Hiruma, Tokyo (JP)

(73) Assignee: Janome Sewing Machine Co., Ltd., Tokyo (JP)

(*) Notice: Subject to any disclaimer, the term of this patent is extended or adjusted under 35 U.S.C. 154(b) by 64 days.

(21) Appl. No.: 10/031,466

(22) PCT Filed: Jul. 31, 2001

(86) PCT No.: PCT/JP01/06592

§ 371 (c)(1),
(2), (4) Date: Jan. 17, 2002

(87) PCT Pub. No.: WO02/16091

PCT Pub. Date: Feb. 28, 2002

(65) Prior Publication Data

US 2002/0107612 A1 Aug. 8, 2002

(30) Foreign Application Priority Data

Aug. 25, 2000 (JP) .......................................... 2000-255138

(51) Int. Cl.⁷ .............................................. G06F 19/00
(52) U.S. Cl. .................... 700/245; 700/255; 700/247; 700/249; 700/258; 700/259; 700/260; 700/261; 700/262; 414/217; 414/226.01; 414/411; 414/416.03; 414/730; 414/754; 318/568.1; 318/568.11; 318/568.13
(58) Field of Search .................... 700/245, 255, 700/247, 178, 250, 249, 258, 259, 260, 261, 262, 264, 159; 414/217, 226.01, 411, 416.03, 5, 730, 754, 936, 937, 744.3, 744.5, 744.6; 318/568.11, 568.1, 568.13, 568.15, 568.16, 568.22; 219/124.34, 124.24; 901/5, 9, 1, 47, 42; 701/23

(56) References Cited

U.S. PATENT DOCUMENTS

| | | | | |
|---|---|---|---|---|
| 4,396,987 A | * | 8/1983 | Inaba et al. ................. 700/249 |
| 4,482,968 A | * | 11/1984 | Inaba et al. ............ 318/568.22 |
| 4,548,346 A | * | 10/1985 | Kraus et al. ................ 228/49.6 |
| 4,965,499 A | * | 10/1990 | Taft et al. .............. 318/568.11 |
| 5,495,090 A | * | 2/1996 | Mukai et al. .......... 219/124.34 |
| 6,360,144 B1 | * | 3/2002 | Bacchi et al. ............... 700/250 |
| 6,526,373 B1 | * | 2/2003 | Barral ........................... 703/6 |

OTHER PUBLICATIONS

Nakmura, Development of off–line programming system for spot welding robot, 1993, IEEE, pp. 223–228.*

* cited by examiner

Primary Examiner—William A. Cuchlinski, Jr.
Assistant Examiner—McDieunel Marc
(74) Attorney, Agent, or Firm—Nields & Lemack

(57) ABSTRACT

A robot wherein the condition for a work and a sequence of movements to be performed may be set in connection with positions. In addition to setting a position at which a work is performed, the robot sets the conditions for performance of a work at a set position and of a sequence of movements between set positions. The set conditions may be memorized in connection with the set positions so as to be performed as are read out.

23 Claims, 21 Drawing Sheets

FIG.2

| Point number Pn/position coordinate | Predetermined work A | Other works B,C... |
|---|---|---|
| P1/x1, y1, z1, θ1 | Work A, Operation a1 | Work C, Operation c1 |
| P2/x2, y2, z2, θ2 | Work A, Operation a2 | Nonexistence |
| : | : | : |
| Pk/xk, yk, zk, θk | Work A, Operation ak | Work B, Operation b3 |
| : | : | : |
| Pn/xn, yn, zn, θn | Work A, Operation an | Work E, Operation e2 |

| ⟨Point data⟩ | ⟨Point data⟩ | ⟨Point data⟩ |
|---|---|---|
| P1 | P2 | P3 |
| 0,0,30 | 100,100,30 | 100,200,0 |
| Work 3 | Work 3 | Work 2 |
| PTP:PTP control | L:Straight line interpolation | |
| SPPED=10 | TIME=5 | |

20

SYSTEM FOR OPERATING A ROBOT WITH EASY PROGRAMMING

FIELD OF THE INVENTION

The present invention relates to a robot and more particularly relates to a robot which may be operated with easy programming or teaching.

Prior Art:

Generally a robot is operated under control and teaching of a programming language including a robot language and the like wherein the instructions are arranged so as to be carried out progressively in order. The positions for working are dealt with as constants and variables in the program. The movements between the working positions are made under control of the moving instructions provided together with the other instructions in the instruction arrangement.

However, in case the essential operation of robot is considered to be the movement between the working positions, the program formed on the basis of the conventional instruction arrangement will make it difficult to grasp the relation between the working positions and the movements made between the working positions, and between the working positions and the works at which the works are performed. It has, therefore, been so difficult to form and maintain the program.

The invention has been provided to eliminate the defects and disadvantages of the prior art. It is, therefore, an object of the invention to provide a robot which may be operated by simple programming or teaching operation for setting working positions, works to be performed at the working positions and the movements between the working positions.

SUMMARY OF THE INVENTION

For attaining the objects, the invention substantially comprises means for setting a position for carrying out a work, means for setting a work at a set position, control means for carrying out the set work at the set position.

With the structure as mentioned above, a work may be set in connection with a set position. It is, therefore, apparent that the programming or teaching may be easily made.

In this connection, a specific function may be predetermined or may be changed to optionally set the working position and the work at the working position.

Further, means for setting a moving sequence and a moving mode may be provided. Further, the instructions may be provided to change the moving sequence in dependence upon a required condition, and other required instructions may be provided. Further, the positions may be set in combination wherein another work at another position may be performed. Since these are all set in reference to the positions which have been already set, the program may be so easily formed.

BRIEF DESCRIPTION OF THE DRAWINGS

FIG. 2 is an explanatory view of a data memory 8 shown as one embodiment of the invention by way of example and showing a manner of data to be stored therein.

FIG. 7 is an explanatory view showing the arrangement of data for setting a sequence of movements.

DETAILED DESCRIPTION OF THE PREFERRED EMBODIMENTS

The invention will be described in detail in reference to the embodiment shown in the attached drawings.

Figure 1:
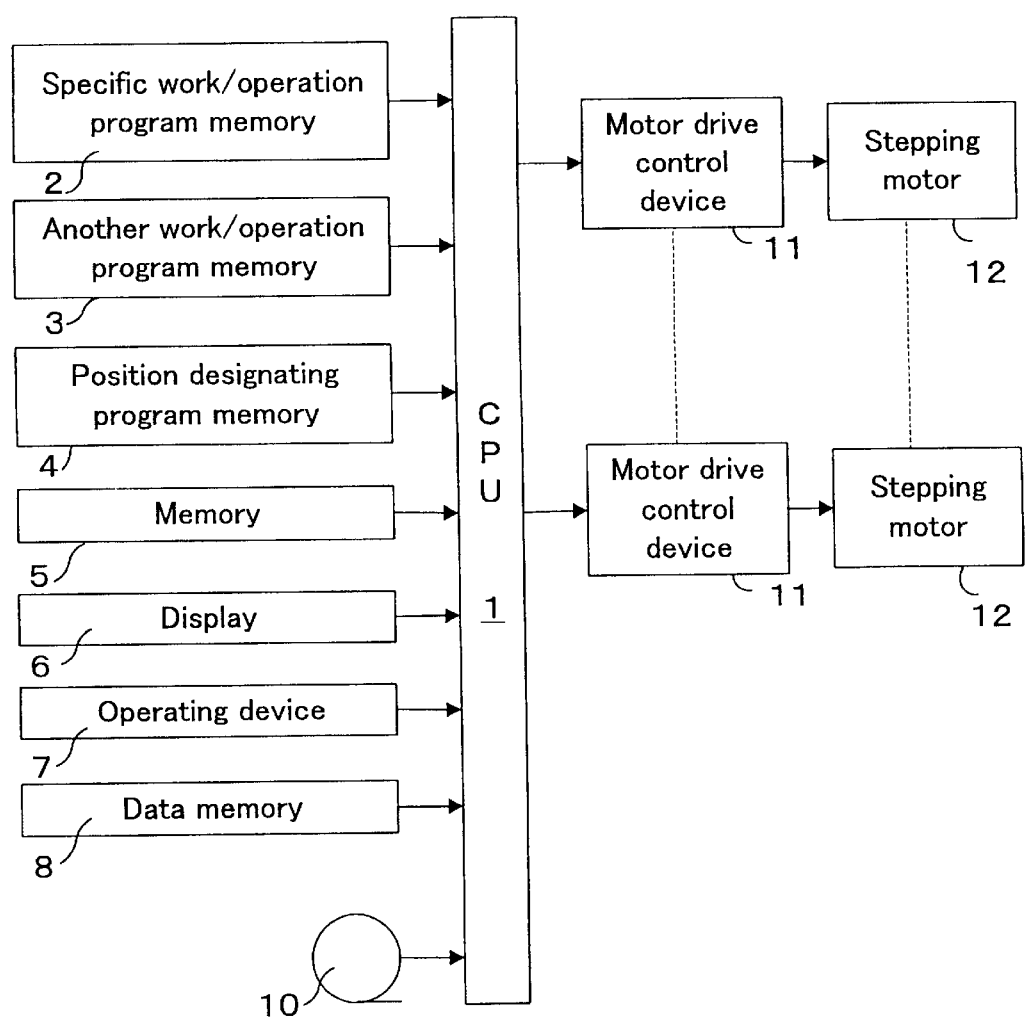
FIG. 1 is a block diagram showing the functions of an embodiment of the invention.

In FIG. 1, a control device 1 including a microcomputer as a main element is provided to control the operation of a robot. The control device 1 gives instructions to a motor drive control device 11 to drive a stepping motor 12, thereby to operate the robot in various ways. The motor drive control device 11 and the stepping motor 12 are provided in so many number as are required to operate the robot respectively. The stepping motor 12 is operatively connected to a mechanism (not shown) which is operated to do a required work. The stepping motor 12 may be replaced by an actuator of any kind and may be of a closed loop.

A recording medium 10 may be connected to the control device 1 so that required programs and data may be inputted therefrom. The program of the recording medium 10 is stored in a specific wok/operation program memory 2, an other wok/operation program memory 3 and position setting program memory 4 respectively. The reference numeral 5 is a temporary memory.

An operating device 7 is provided to be operated to input programs and data into the robot and includes key board, hardware and software mechanisms for teaching.

A user may operate the operating device 7 to set a position at which a work is done, to set the content of the work and to set a sequence of movements. Further, a mode of movement, a change of moving route in dependence upon a required condition, output of instruction during movement and others may be set in connection with the set positions.

According to the embodiment, a display 6 is provided in connection with the position setting program memory 4 so that the user may set a position for working at the display 6 by use of the program stored in the position setting program memory 4.

Further, according to the embodiment, a predetermined work is set as an inclusive application which may be used as it is or may be optionally changed or may be used in mixture with an application which is made by the user.

Namely, the specific wok/operation program memory 2, has various programs stored therein for operation of a specific work.

The operator may set a position for working by use of the programs stored in the position setting program memory 4 and may select required operations in reference to selecting information shown in the display 6. According to the embodiment, each position is given a point number and the coordinate of the point number is set.

As to the operations for a specific work, the program may be set by the operator through the operating device 7 or another input device instead of being selected from the programs stored in the specific wok/operation program memory 2. Further, both of the selection and setting may be performed.

In the other work/operation program memory 3, a singular or a plurality of working programs for a work or works which are other than the specific work or works. The selection may be performed in reference to the selecting information shown in the display 6.

Further, in the other work/operation program memory 3, various operation programs for other works to be selected in reference to the selecting information shown in the display 6.

As to the other works, the program may be set through the operating device 7 or another input device instead of being selected from the programs stored in the other wok/operation program memory 3. Further, both of the selection and setting may be performed.

As to the operations for the other works, the program may also be set through the operating device 7 or another input device instead of being selected from the programs stored in the other wok/operation program memory 3. Further, both of the selection and setting may be performed.

The selected or set work and operation are stored as points in a data memory 8.

FIG. 2 shows the data memory 8 for storing the point data by way of example.

The point data 20 are provided with point numbers respectively. For each of the point numbers, the position coordinate, the predetermined work A and operation for the work A and the other work and the operation are selected or set and stored. For example, for point number 1, the coordinates of x1, y1, z1, θ1, the work A and the operation a1 for the work are selected, and further the other work C and the operation dare selected.

For the point number 2, the coordinate x2, y2, z2, θ2 and the operation a2 are set and the other work is not set. In this way, until the point number Pn is reached, the coordinates, the predetermined works and the operations, and the other works and the operations are selected or set by the operator.

The control device 1 selectively reads out the works and operations from the data memory 8 so that the read out work and operation may be carried out at the coordinate position of the point number in accordance with the programs read out from the specific work/operation program memory 2 and from the other work/operation program memory 3.

Figure 3:
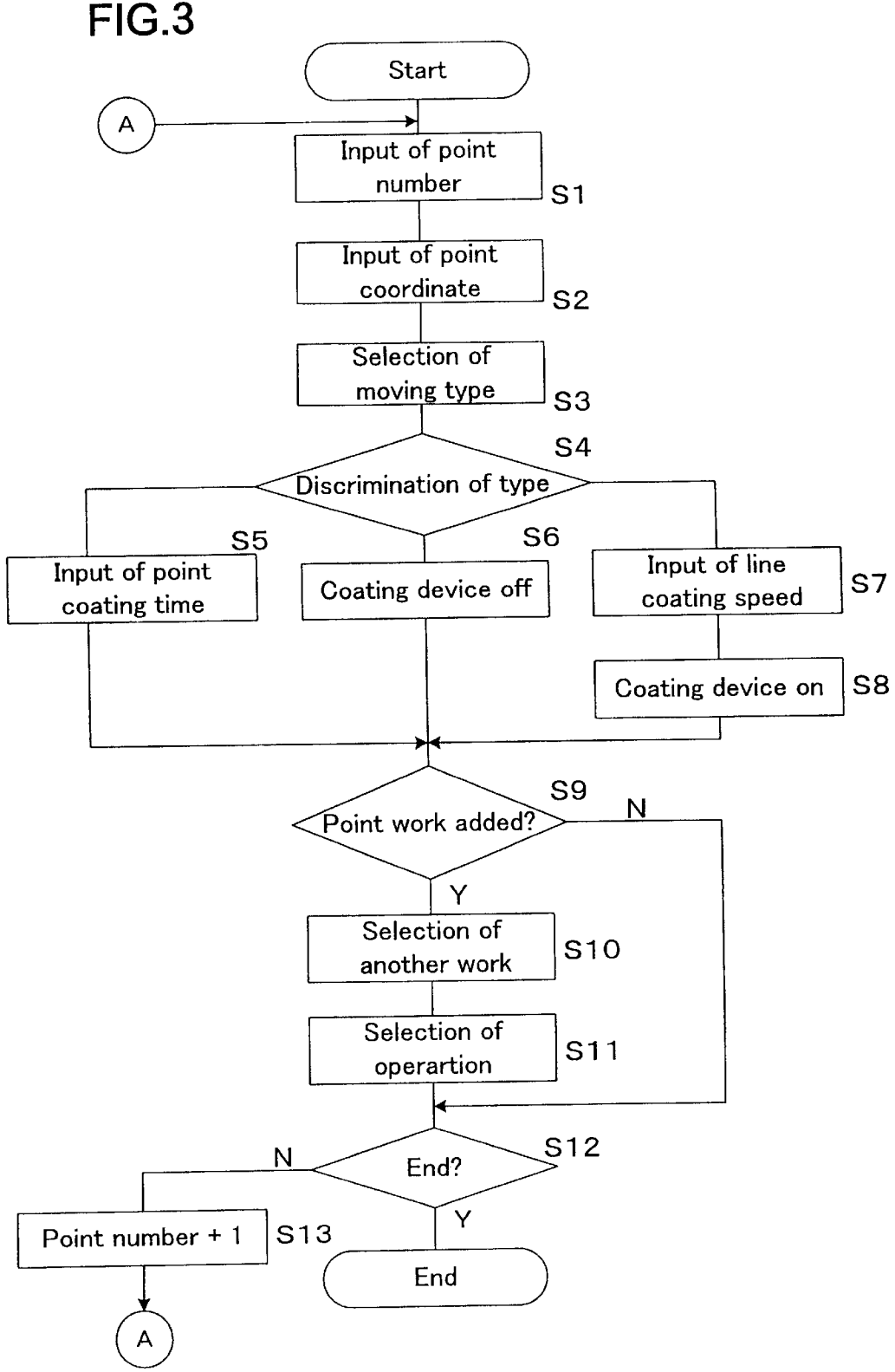
FIG. 3 is a flow chart showing the operations of the invention by way of example.

Operation will be described by way of example in case of a coating work in reference to FIG. 3.

The operator operates the operating device 7 to input (steps S1, S2) a point number and the position coordinates, and further input (step S3) a type of operation for a predetermined work.

In case the type of operation is a point coating, a period of time is inputted (step S5). In case a line coating is finished, the coating device is turned off (step S6). In case the line coating is started, a speed is inputted (step S7) and the coating device is turned on (step S8).

In case another work is added (step S9), the work is selected (step S10) and the operation for the work is selected (step S11).

Thus the operations and works are selected or set for all of the point numbers (steps S12, 13). When this is finished, the works and operations are carried out in accordance with the selected or set contents.

According to the embodiment, each point is provided with a content of work and a content of operation. However, each point may be additionally provided with various contents of control.

Figure 4:
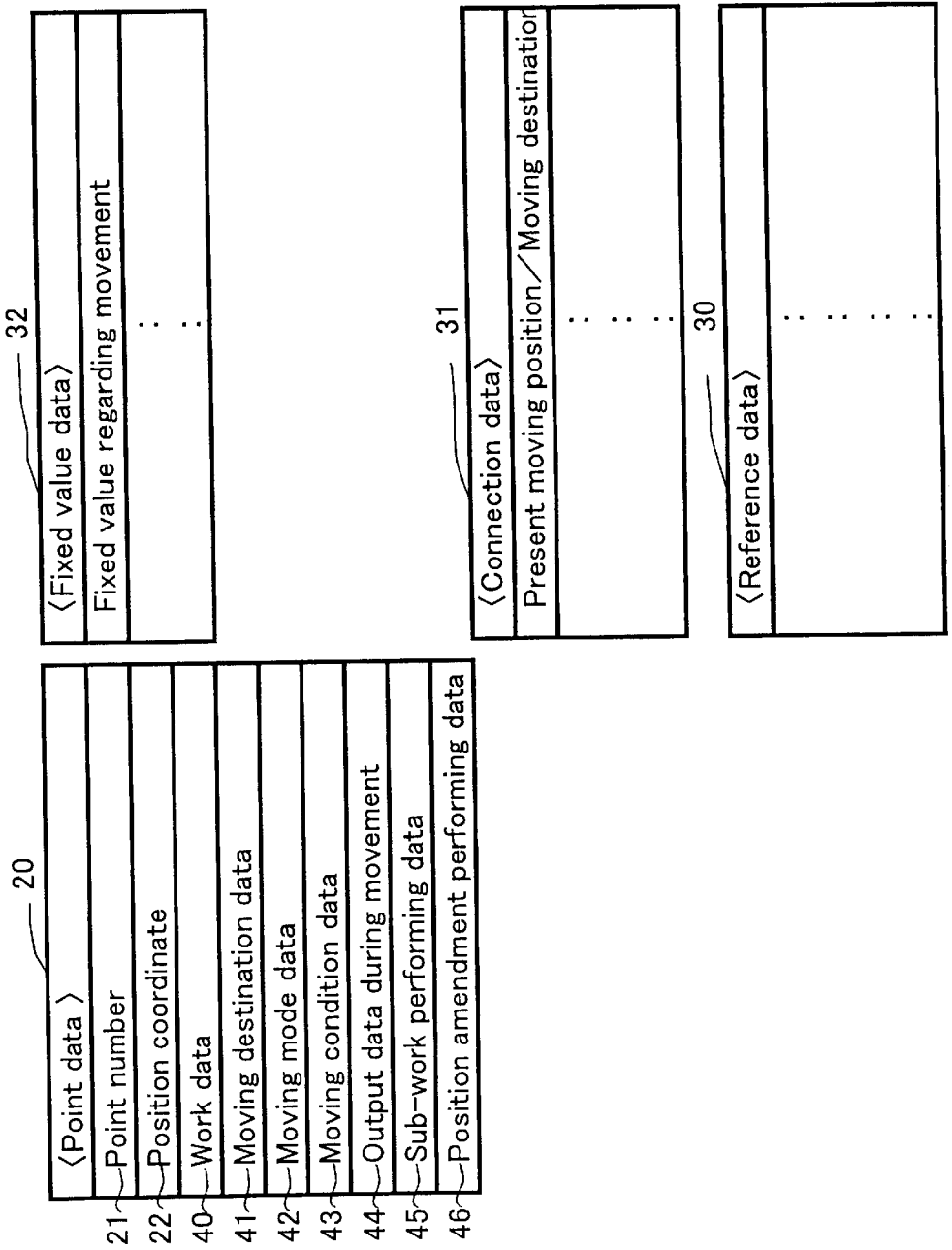
FIG. 4 is an explanatory view of a data structure of the invention shown by way of example.

FIG. 4 shows another embodiment for providing the contents of point data 20.

Here, the point number 21 for specifying a moving sequence of point and the position coordinate 22 for specifying a moving point are provided together with the work data 40.

The position coordinate 22 specifies one point, but may be accompanied with the data such as the pallet data or the like for specifying a plurality of positions designating minute movements as will be described in] detail hereinlater.

The moving destination data 41 is provided to set a destination. With presence of the moving destination data 41, the moving sequence may be specified without setting the point number 21.

The moving mode data 42 are various data for movements and are provided to set PTP control, straight line interpolation, circular interpolation, moving speed, movement accelerating speed, moving period of time and the like.

The moving condition data 43 may be set. The data may be provided to make various movements including skipping the next moving destination in dependence upon a condition which may be permitted.

The during movement output data 44 may be provided to produce output while the robot is operated to move. For example, when the robot is moved a predetermined distance, a signal is produced to move another appliance, or a signal is outputted to stop the robot upon receipt of a signal from a sensor or another appliance.

The sub-work performing data 45 is instruction data for dealing with errors and for performing a work which may be accompanied with a preparation movement required to be made prior to initiation of the work.

The position amending data 46 is instruction data for amending an error including a displacement of position.

The data as mentioned above may be provided in the point data 20 or may be separately provided as reference data 30.

Preferably the data for movement may separately provided as connection data 31. Further, predetermined fixed values may be separately provided as fixed value data 32 so as to be optionally referred to.

A Moving Sequence:

FIG. 2 shows the points having numbers attached thereto respectively so that the robot may be operated to move sequentially of the point numbers. The sequence of movements to the points and performances of work will be described in reference to FIGS. 5 to 7.

Figure 5:
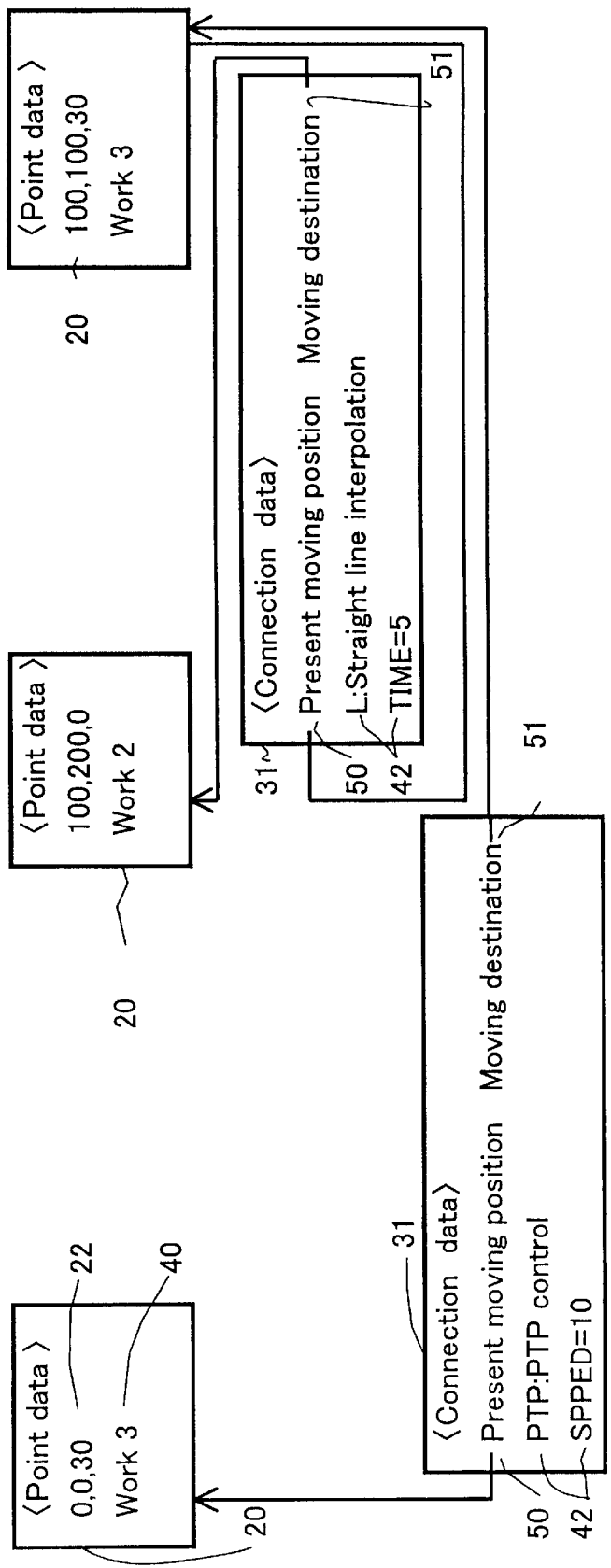
FIG. 5 is an explanatory view of a data structure provided with connection data 31 to be used.

FIG. 5 shows an embodiment for enabling the user to set the connection data 31 showing the moving route between the points. The connection data 31 includes present position data 50 for deciding a moving destination and moving destination data 51 so that the connection data 31 may be referred to for each point to recognize the next moving destination.

Figure 6:
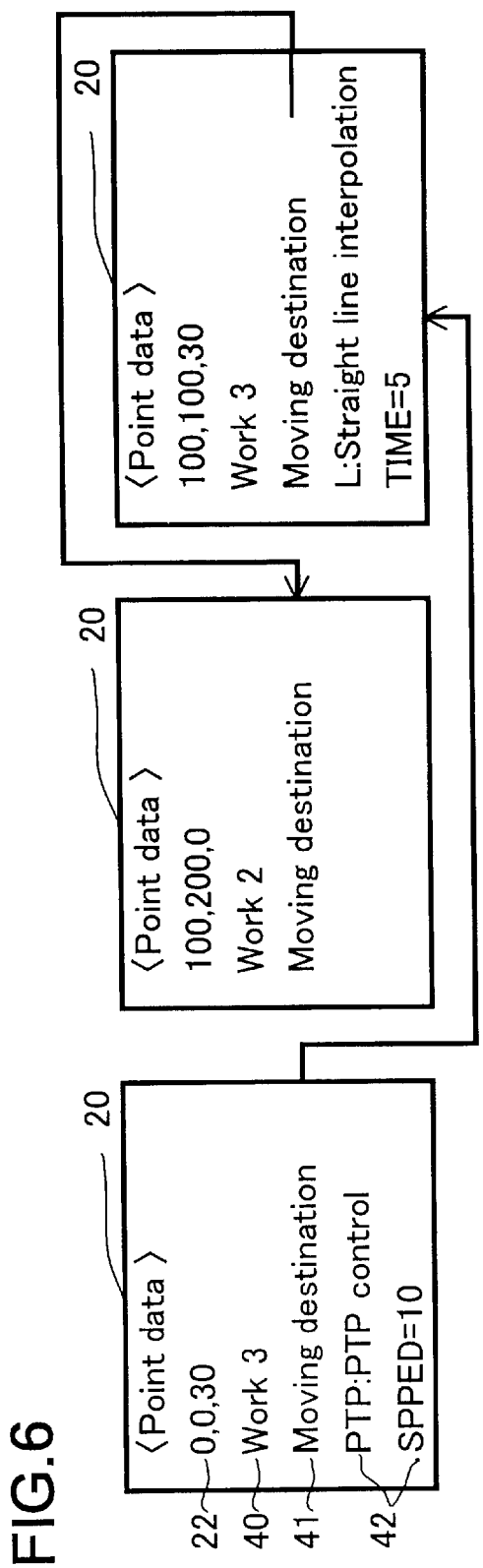
FIG. 6 is an explanatory view of a data structure provided with moving destination data 41 to be used.

FIG. 6 shows an embodiment for setting the moving destination data 41 directly in the point data 20 without using the connection data 31.

FIG. 7 shows an embodiment wherein the point data 20 are arranged in order of performance for making movement and working in this order.

As mentioned above, in the embodiments 5 to 7, the user may decide the sequence of performance after setting the points by use of the point data 20. Thus the working program may be efficiently constructed.

Figure 8:
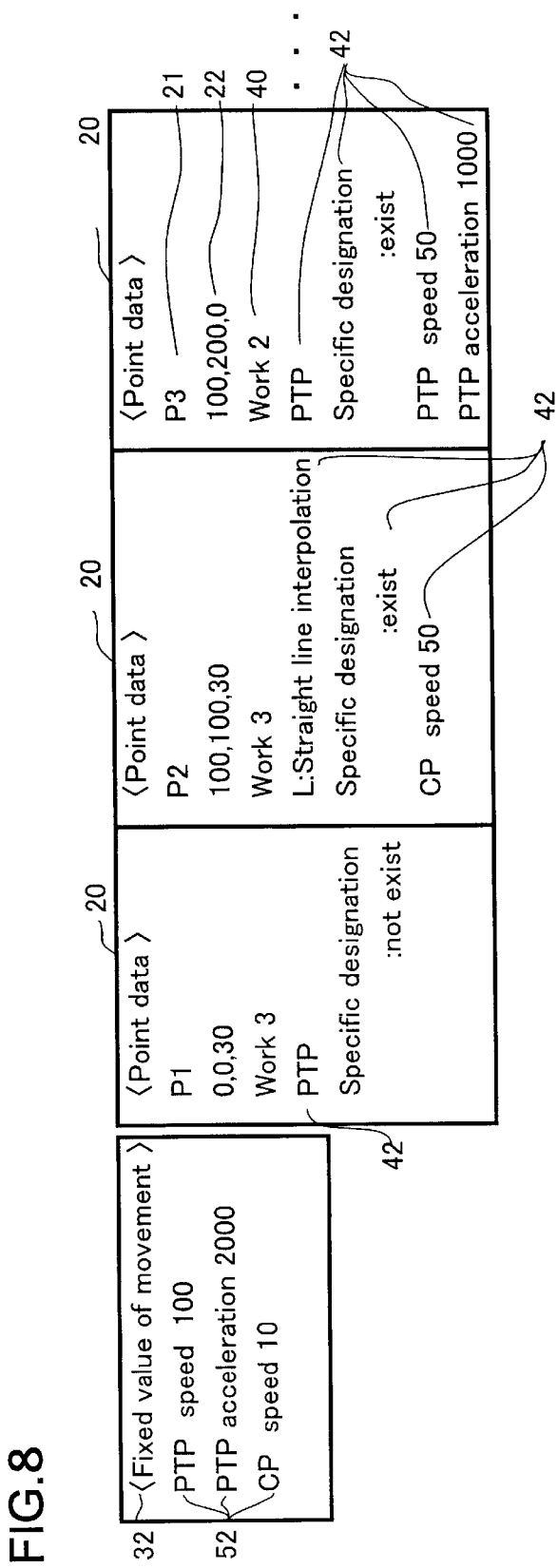
FIG. 8 is an explanatory view of a data structure showing a mode of movement provided with fixed value data 32 to be used.
Figure 9:
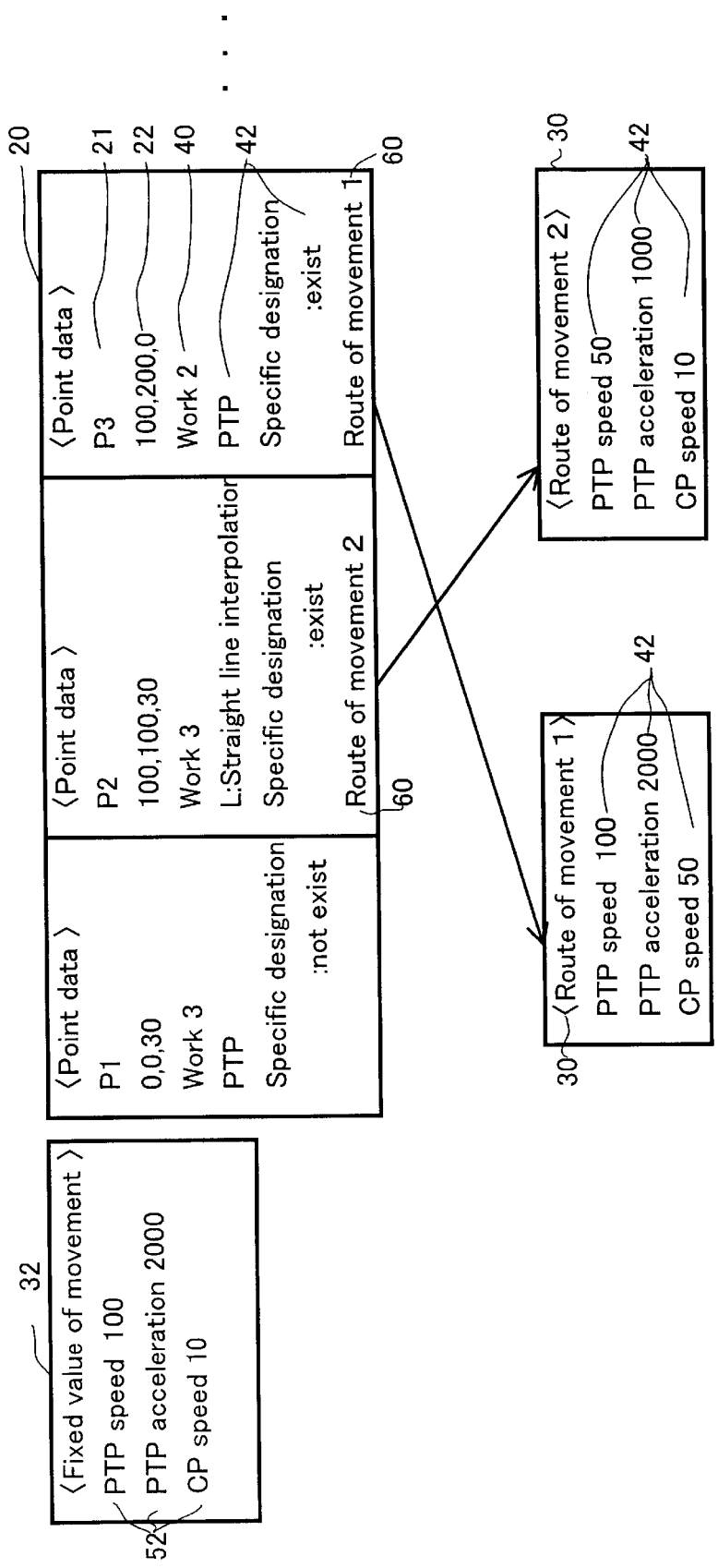
FIG. 9 is an explanatory view of a data structure showing a mode of movement provided with reference data 30 to be used.

FIGS. 8 and 9 show the examples for setting moving mode data 42 in each point data 20.

According to the example in FIG. 8, the point data 20 includes the interpolation designating data (PTP drive, straight line interpolation, circular interpolation) to be set and the detailed moving mode data 42 to be set to the individual point data 20, or the fixed values are read out to be used. As the fixed value data 32, the moving mode data 52 is set. In case the individual moving mode data 42 is not set in the point data 20, the data set in the fixed value data 32 may be used.

According to the example in FIG. 9, in case the moving mode data 42 are individually set, the read-out data 60 is used to read out the reference data 30, thereby to use the moving mode data 42 as set in the reference data 30.

In case there is no individual designation, the fixed moving mode value 52 may be used.

As mentioned above, the moving mode data 42 includes designation of interpolation, moving speed, acceleration, period of time by way of examples. However, the moving mode data 42 is not limited to the enumerated one, but may include other data to be set, for example, for an R shaft rotation speed and arch motion.

Figure 10:
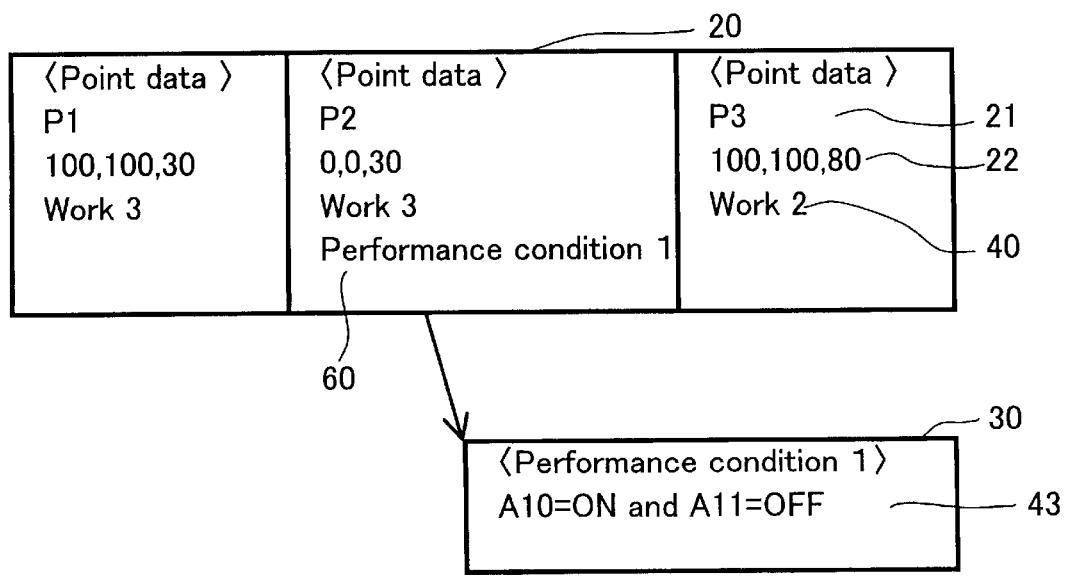
FIG. 10 is an explanatory view of a data structure for jumping a moving destination in dependence upon a condition.
Figure 11:
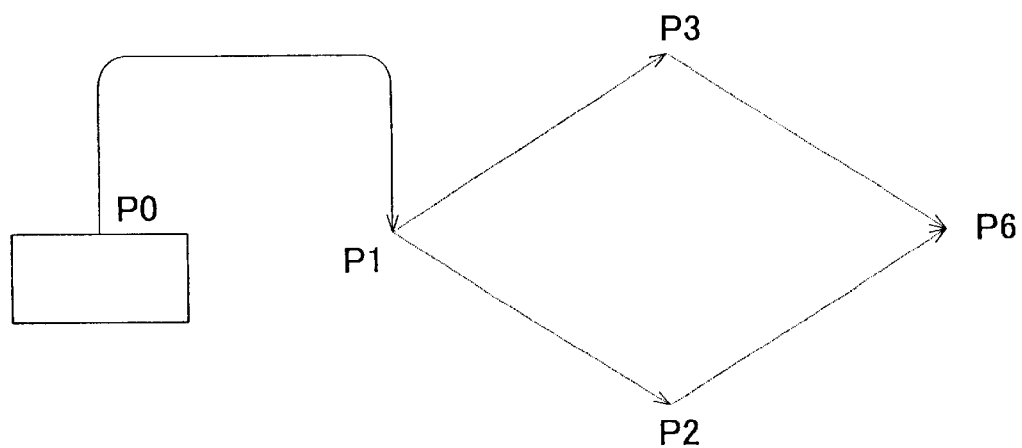
FIG. 11 is an explanatory view of an operation for jumping a moving destination in dependence upon a condition.

Change of Moving Sequence:

FIGS. 10 and 11 show an embodiment for setting the moving condition data 43 to change the moving route.

According to the embodiment, movement is made from point P0 to P1 and then to P2. In this embodiment, the point data 20 including the point P2 further includes the moving condition data 43. In this case, the read-out data 60 is set and the reference data 30 includes the moving condition data 43, wherein an AND condition is provided, for example, a signal A10 is ON and A11 is OFF.

Prior to movement from P1 to P2, the point data 20 including the point P2 is checked. In case the condition as mentioned above is satisfied as shown in FIG. 11, movement is made to P2, and if not satisfied, movement is made to P3.

Thus the change of moving route may be made in accordance with a required condition.

Control During Movement:

Subsequently, a control for movement and stop with output and input of a signal during movement will be described.

A signal may be produced while the robot is moving. For example, it may be required to start the robot from a position that is 10 mm from initiation of movement and to stop the robot by a signal from a device or sensor.

Figure 12:
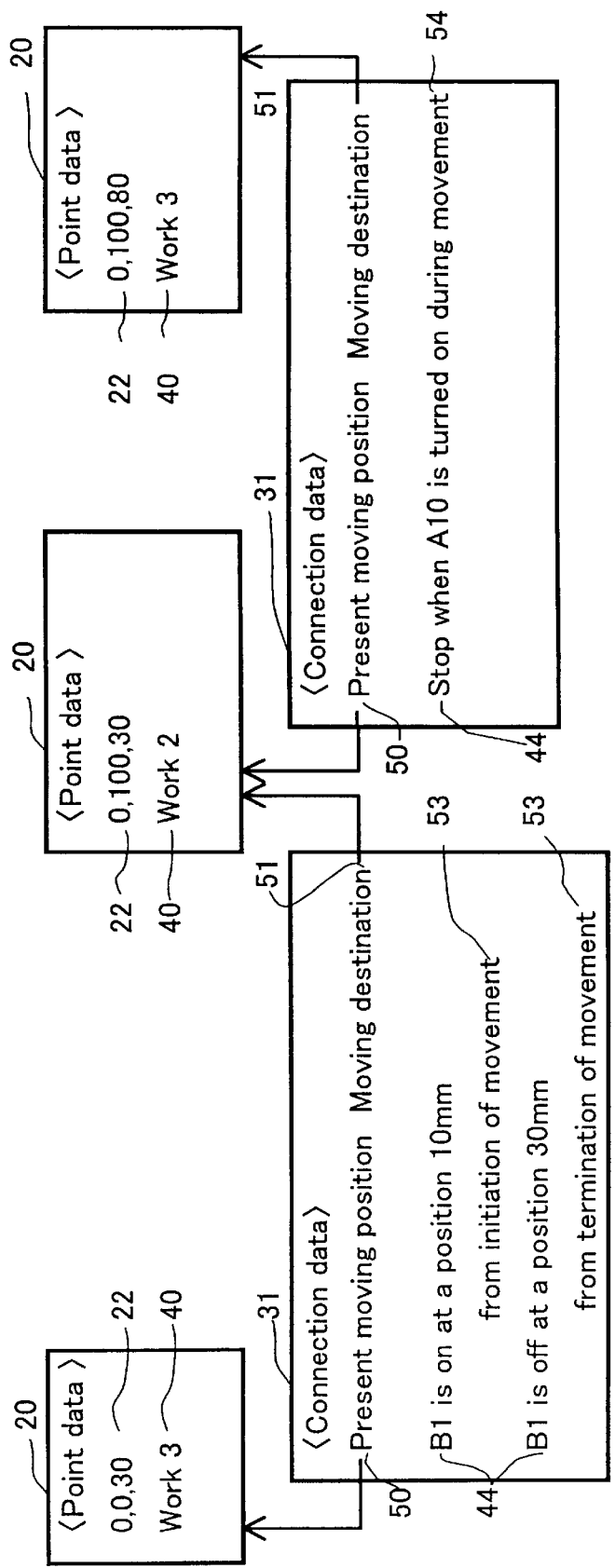
FIG. 12 is an explanatory view of the embodiment of data structure wherein a control instruction is generated during movement.
Figure 13:
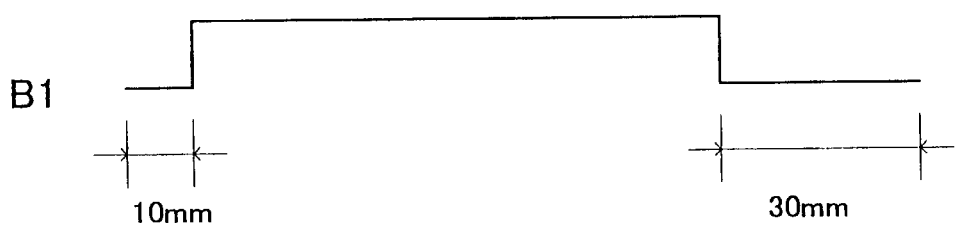
FIG. 13 is a diagrammatic view of a timing to be taken in FIG. 12.

FIGS. 12 and 13 show an embodiment for making such control.

As shown in FIG. 12, the connection data 31 includes the output data in-movement 44.

The point data 20 including the coordinate (0, 0, 30) has the connection data 31 having control data 53 being set therein, where the signal B1 is turned on at a position that is 10 mm from initiation of movement and is turned off at a position that is 30 mm prior to termination of movement. It is a matter of course that a period of time may be set instead of distance.

FIG. 13 shows the signal B1 turned on and turned off.

The point data 20 including the coordinate (0, 100, 80) has the connection data 31 having stop data 54 being set therein, where the signal A10 is turned on to stop the movement.

Figure 14:
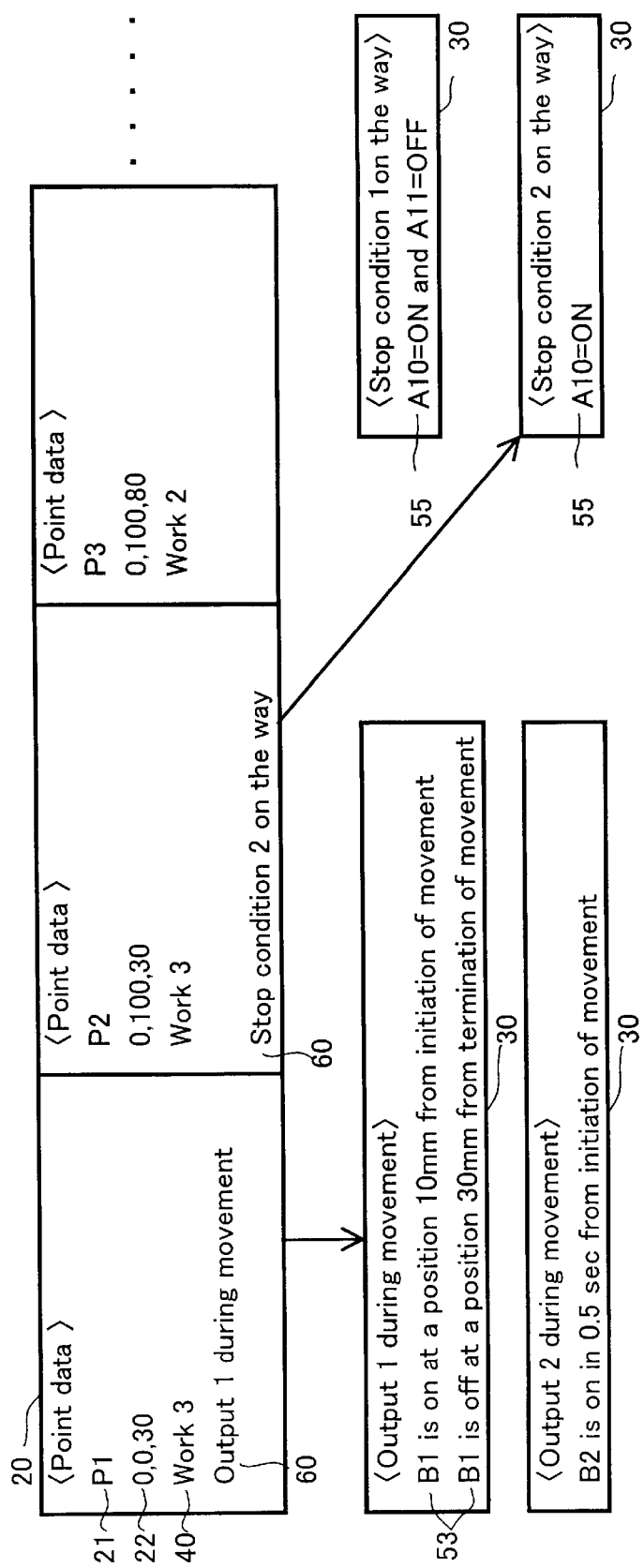
FIG. 14 is an explanatory view of a data structure provided with reference data 30 for generating a control instruction during movement.

FIG. 14 shows an embodiment wherein instead of the connection data 31, the reference data 30 has control data 53 and stop condition data 55 set therein. The point data 20 has read-out data 60 set therein and the reference data 30 has control data 53 and/or stop condition data 55 set therein. The content of operation is the same as in the embodiment of FIG. 12.

In this way, various signals may be produced to make various operations during movement.

Figure 15:
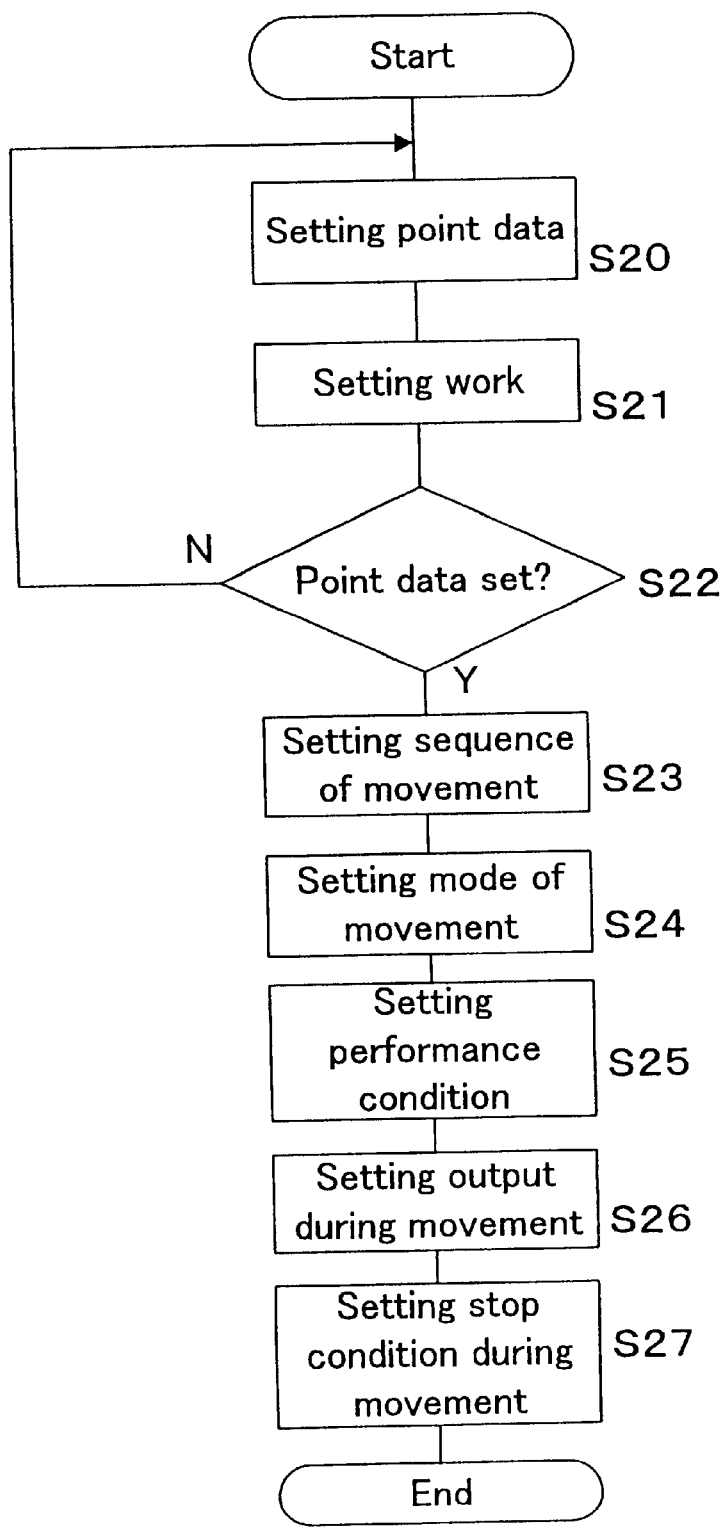
FIG. 15 is a flow chart showing a general operation of the invention.

Operation of the embodiment will be described in reference to FIG. 15.

The point data is set in the data memory 8 to set position coordinates 22. The point number 21 is set if needed (step S20). Subsequently, a work or operation for the work at the point is set (step S21). The same setting is performed as to all points (step S22).

Subsequently, a moving sequence is set (step S23). In case the connection data 31 is used, a present position data 50 and a moving destination data 51 are set. The moving destination data 41 may be directly written in without using the connection data 31. In case the arranging sequence of point data is the moving sequence, the point data are arranged in such sequence.

Subsequently, the moving mode data 42 such as designation of interpolation, speed, acceleration, period of time are set. In case the fixed value is used, the value is set (step S24). Then the performance condition is set (step S25), the output-in-movement is set (step S26) and then the stop condition-in-movement is set (step S27).

In this case, the step S22 may be located anywhere. In the above mentioned way, all point data are precedingly set. But this is not always the only way. It is possible, for example, to set the step 21 and the subsequent steps simultaneously at the time of setting one point data.

Pallet Data:

In the movement of robot, there is a repetition of minute movement. For example, in case something is placed on a pallet side by side, it is required to regularly repeat movement from one place to the next with constant displacement of position. It is actually troublesome to do teaching each movement and to set the coordinates, and further this will require so much capacity of memory.

In order to solve such problem, subordinate position setting data called a pallet may be used.

Such pallet data may be set for each point as is required.

Figure 16:
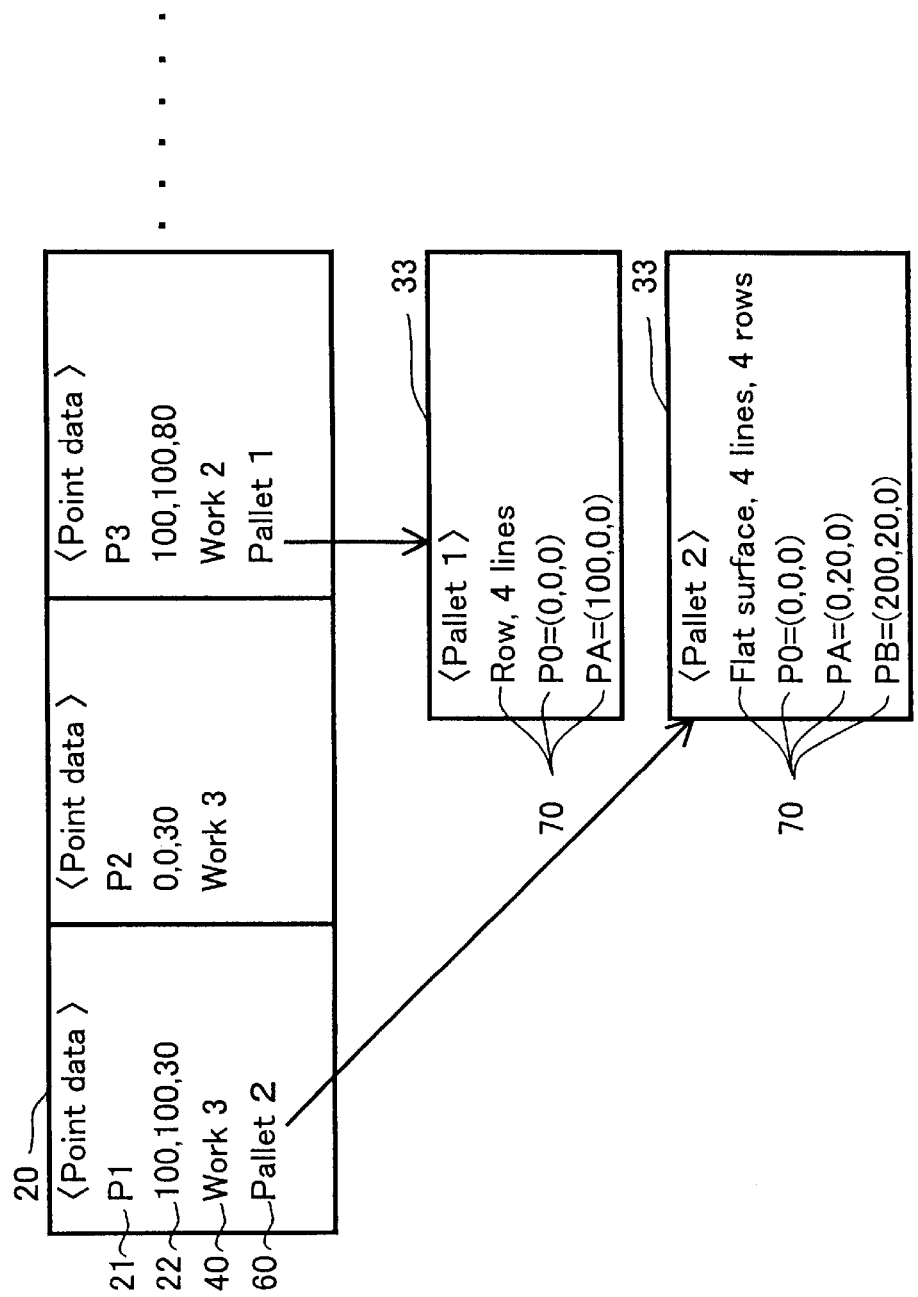
FIG. 16 is an explanatory view of a data structure for performing a pallet operation.

In FIG. 16, the point data 20 includes read-out-data 60 which may be used to read out the pallet data 33. The pallet data 33 includes pallet moving data 70.

The pallet data may include 0 dimension, 1 dimension, 2 dimensions, 3 dimensions. The 0 dimension pallet is a data for designating one point where one or a plurality of works may be repeated.

The 1 dimension pallet is only for a straight line movement (side by side direction). The 2 dimension pallet is for movement in vertical and lateral directions.

The 3 dimension pallet is for movement in vertical, lateral and height directions.

In FIG. 16, the pallet 1 is 1 dimension pallet showing the movement in the side by side direction in four lines. PO is an original point coordinate. PA shows an increment amount in one direction.

Pallet 2 is 2 dimension pallet showing vertical and lateral movement in four lines and four rows. PO is an original point coordinate. PA shows an increment amount in one direction and PB shows an increment amount in the another direction.

Figure 17:
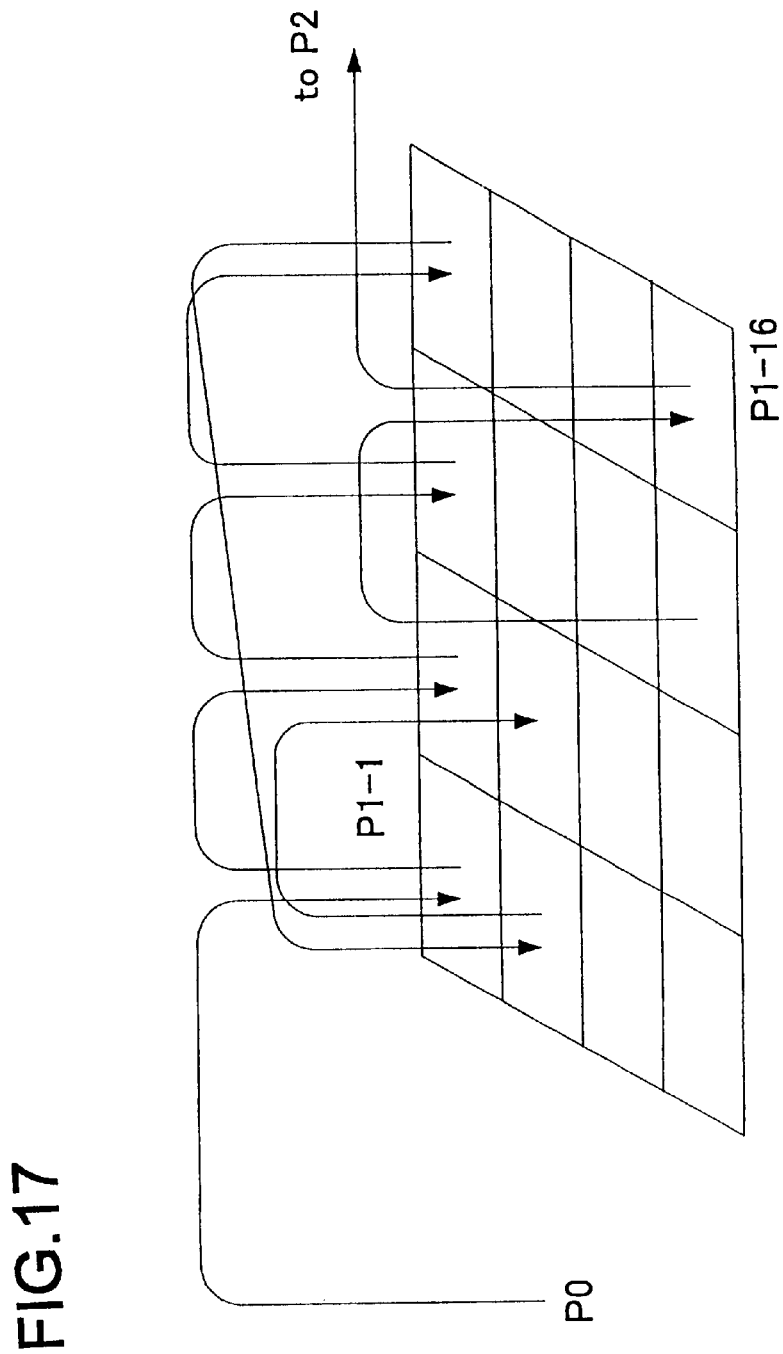
FIG. 17 is an explanatory view of the pallet operation.

FIG. 17 diagrammatically shows the operation performed by setting the pallet, wherein upon movement made from point P0 to point P1 where pallet 2 is set, then movement is made from P1-1 to P1-16 as defined by P0 with the increment amount as defined by PA and PB.

Thus the repetition of minute movement may be easily set for each point.

Sub-Point Data:

In order to perform a work of object, it is required to do a series of operations sequentially. In case errors are produced, it becomes necessary to do exceptional treatment of the errors which is other than the predetermined operations while the robot is moved to a specified position.

Further, it may be required to do a same work at a different position wherein movement is accompanied.

Further, it may be required to do a preparatory operation before the work of object is initiated, for example, to fetch a screw prior to initiation of the screwing work of object, or to clean a soldering iron prior to initiation of soldering work of object.

In order to perform the work accompanied with such incidental operations, it is preferable to set sub-point data to be read out if it is needed.

Figure 18:
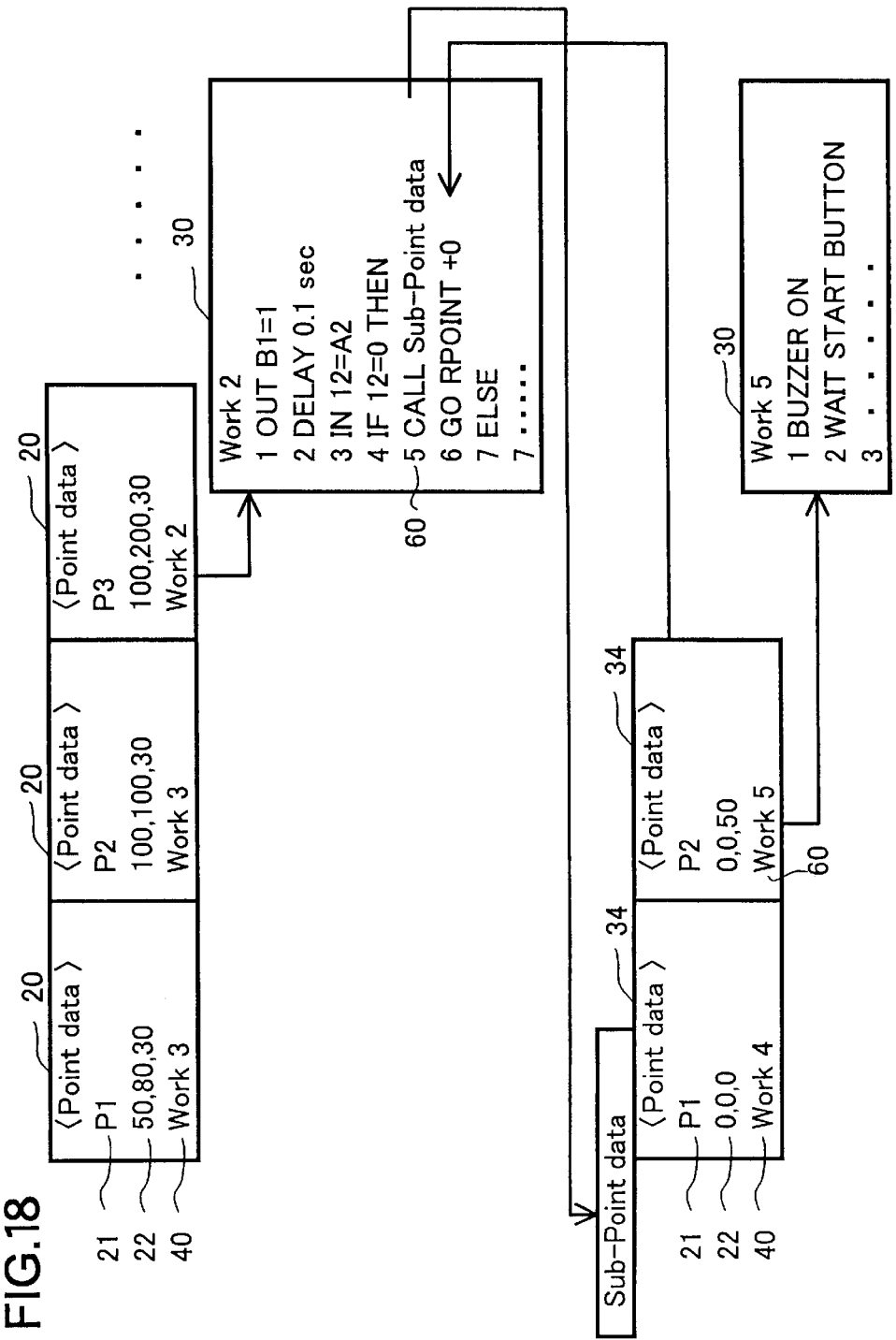
FIG. 18 is an explanatory view of sub-point data 34.
Figure 19:
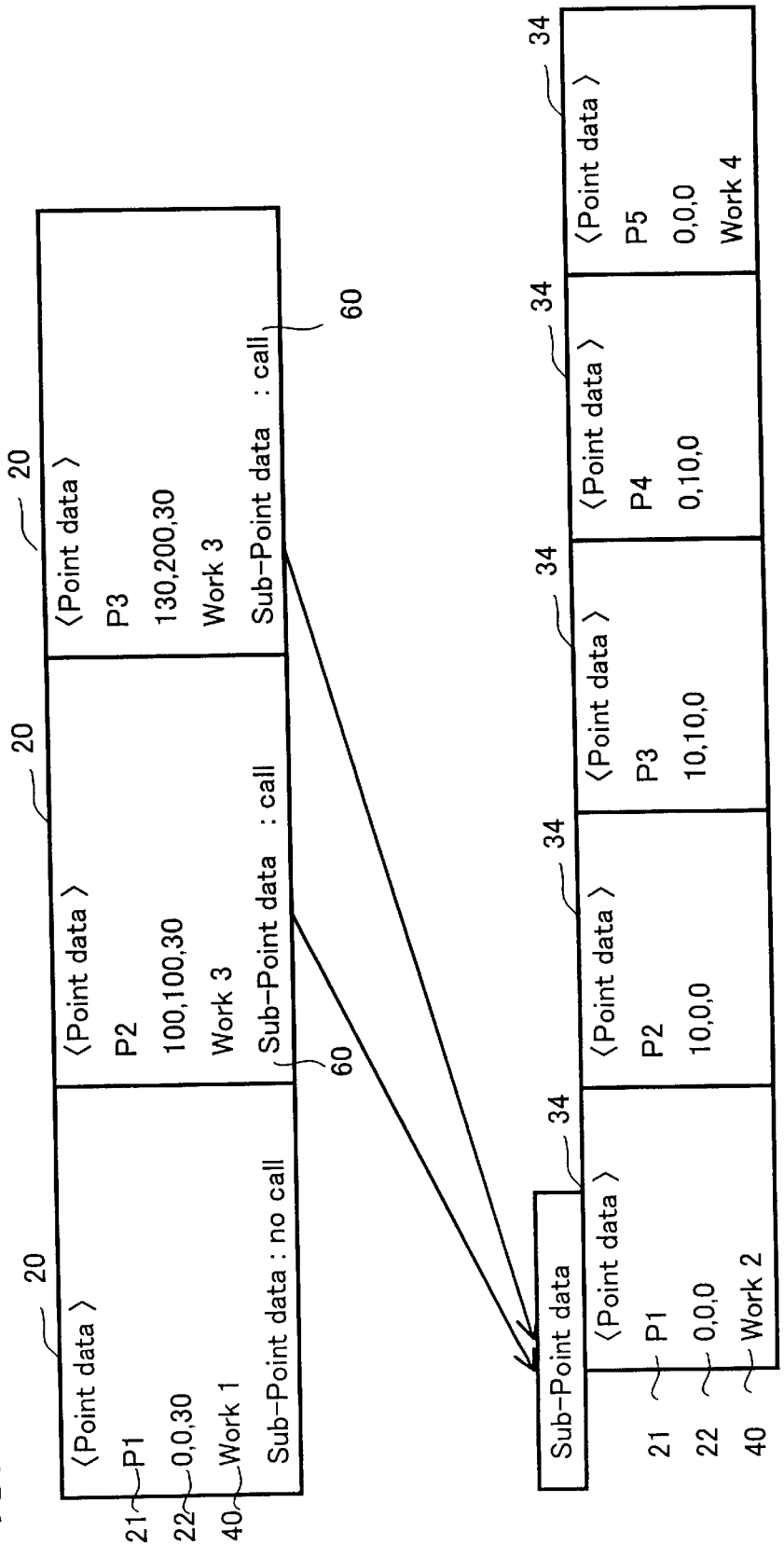
FIG. 19 is an explanatory view of sub-point data 34 which is called out.
Figure 20:
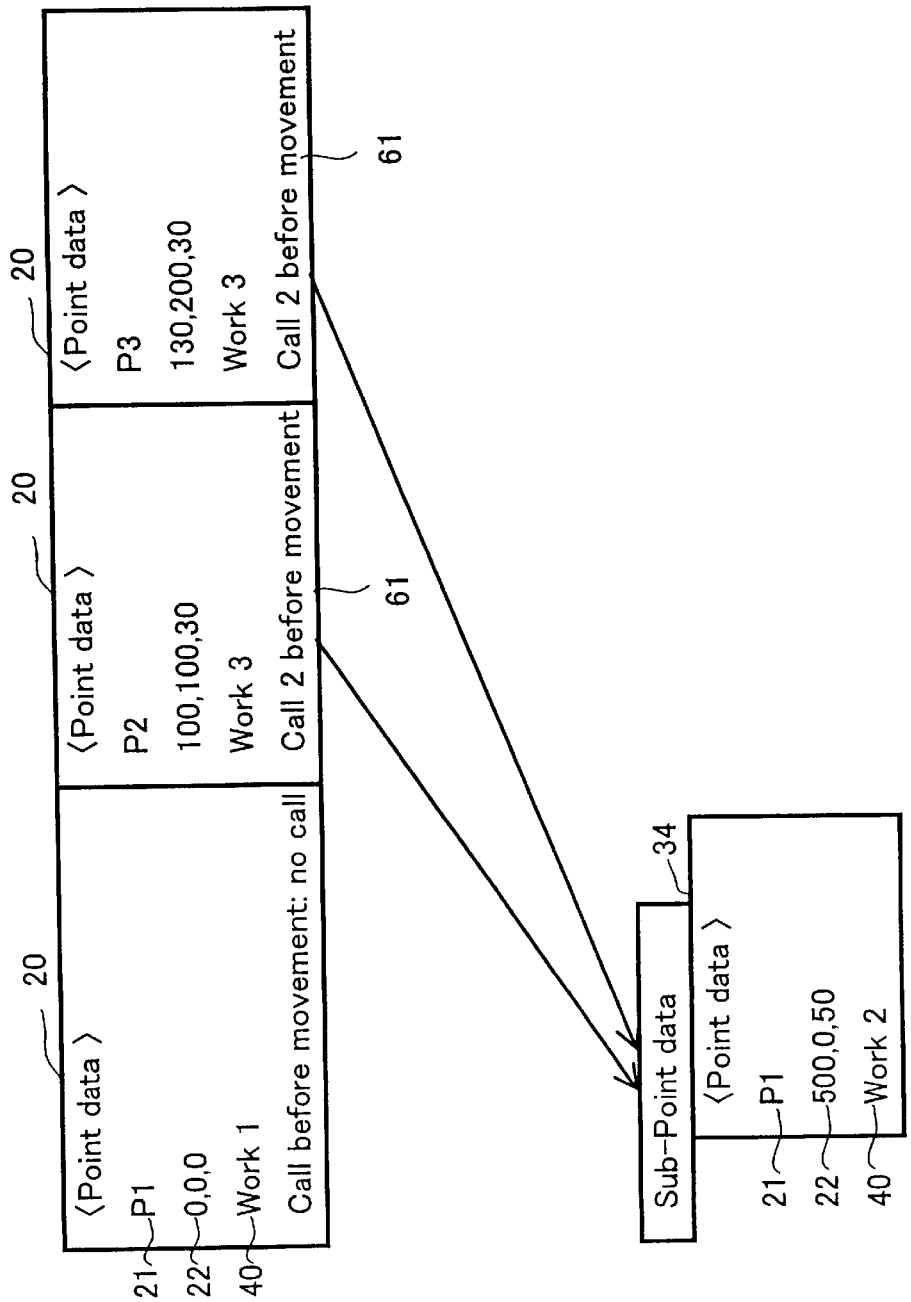
FIG. 20 is an explanatory view of sub-point data 34 which is called out prior to movement.

FIGS. 18 through 20 show the embodiments for using the sub-point data.

In FIG. 18, the point data 20 includes point number 21, position coordinate 22 and work data 40. The work data 40 is provided to read out the reference data 30 for a work, and the reference data 30 includes program data for work 2. The program data includes read-out-data 60 for reading out sub-point data 34 when a condition is established. Namely, in case a condition is established that an error is produced, the sub-point data 34 is read out.

According to the example, the sub-point data 34 is set for two points P1 and P2 where work 4 and work 5 are performed respectively. The work 5 is the read-out data 60, and the content of work 5 is set in the reference data 30.

In FIG. 19, the point data 20 includes read-out data 60 for reading out the sub-point data 34. Here the sub-point data 34 is set for points P1 through P5 so as to perform work 2 and work 4. In case a same work is repeatedly performed at a different position, it is efficient to provide such a series of sub-point data.

In FIG. 20, the point data 20 includes preparation data 61 to be used prior to movement to a point. Precisely, the preparation data 61 is set for point 2 and point 3 respectively so as to be referred to before movement is made from point P1 to Point P2 and to read out the sub-point data 34, thereby to make movement from P1 to P2 after the work 2 is performed.

The preparation data 61 set for point 3 is also treated with in the same way.

Thus a preparatory operation may be performed by reading out the data set for the point to be used before the movement is made to the point.

In this connection, the same operation may be obtained by using the read-out data 60 in place of the preparation data 61, which is set for a preceding point. Namely, the read-out data 60 for reading out the sub-point data 34 may be set for P1. But it will be more effective for setting operation sake to set the preparation data 61 for the point P2 which requires the movement.

Amendment of Position:

The work to be processed may be positionally displaced during processing operation. The processing operation with positional displacement of the work will extremely decrease the processing precision.

According to the embodiment, the position of work may be detected by use of a camera or a sensor to enable the robot to automatically amend the moving operation, thereby to attain a high processing precision.

Namely, the point data 20 includes the amendment amount of positional displacement so that the robot may be controlled to move to a position where the amendment amount is added. Thus the robot may move to a correct position.

Figure 21:
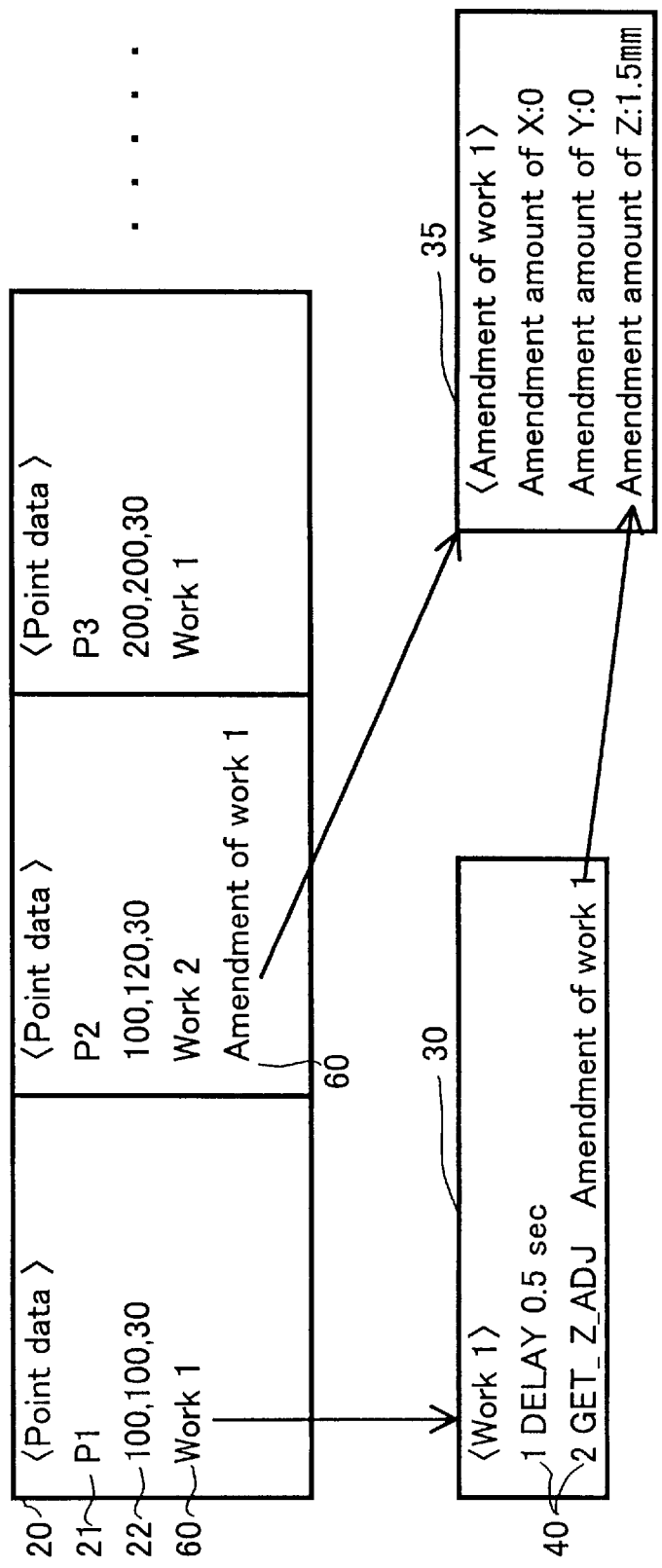
FIG. 21 is an explanatory view of data structure for amendment of positios.

In FIG. 21, the point data 20 including the point P1 further includes read-out data 60 so that the amendment amount in the direction Z may be obtained through the reference data. The work data 40 is provided to detect the position of work in the Z direction after waiting 0.5 second for reducing vibration, thereby to calculate the amendment amount from the detected value.

Further, the point data 20 including the point P2 includes read-out data 60 for reading out position amending data 35. The position amending data 35 includes an amendment amount calculated by the work data 40 of the reference data 30. The amendment amount is applied to the position coordinate 22 of the point P2. Namely, the movement is made to a position (100, 120, 30) where the amendment amount (0, 0, 1.5) is added to the position (100, 120, 30) of P2.

The amendment in X and Y directions may be made in the same way.

Thus the displacement of work is successively amended and a positionally high precision of processing operation may be obtained.

As is described above, according to the robot of the invention, a work may be set in connection with a set position, and the moving sequence and other various conditions may be set, and therefore, programming or teaching may be easily performed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A robot performing a work at a set position, said robot comprising:
   means for setting a position at which work is performed,
   means for setting said works to be performed at said set positions,
   means for setting a sequence of movements between said set positions,
   control means for performing said works at said set positions in said sequence of movements,
   wherein said sequence of movements as being set is memorized as data for indicating a present moving operation and a next moving destination.

2. The robot as defined in claim 1, further comprising means for setting a mode of movement between said set positions.

3. The robot as defined in claim 2, wherein said mode of movement includes at least one or more of interpolation, speed and period of time.

4. The robot as defined in claim 2, wherein said mode of movement as being set is memorized in connection with said set positions.

5. The robot as defined in claim 2, wherein predetermined fixed moving mode data may be used in case said mode of movement is not set.

6. The robot as defined in claim 1, further comprising means for setting a change of sequence of movements in dependence upon a required condition, said sequence of movements being set by said means for setting a sequence of movements.

7. The robot as defined in claim 6, wherein the data as set for changing said mode of movements is memorized in connection with said set positions.

8. The robot as defined in claim 6, wherein the data as set for changing said mode of movements is memorized in connection with said set positions and indicates a condition whether or not the movement is made to said set positions and wherein said control means reads out said set data before movement is made to said set positions to decide whether or not the movement is made to said set positions.

9. The robot as defined in claim 1, further comprising means for setting a control instruction while movement is made between said set positions.

10. The robot as defined in claim 9, wherein said control instruction as being set is memorized in connect with said set positions.

11. The robot as defined in claim 9, wherein said control instruction as being set is outputted on the basis of moving distance.

12. The robot as defined in claim 9, wherein said control instruction includes a stop of movement while movement is made.

13. The robot as defined in claim 12, wherein said set work and said another position as being set are memorized in connection with said set position.

14. The robot as defined in claim 13, wherein said set work and said another position as being set are memorized in connection with said set position.

15. The robot as defined in claim 13, wherein said another position is one of 0 to 3 dimensions.

16. The robot as defined in claim 15, wherein said another work to be performed at said another position is performed at said set position.

17. The robot as defined in claim 16, wherein said another work to be performed at said another position is performed at said set position.

18. The robot as defined in claim 16, wherein said another work to be performed at said another position is performed before movement is made to said set position.

19. The robot as defined in claim 16, wherein said another work to be performed at said another position is memorized, said another work being read out in connection with said set position.

20. A robot performing a work at a set position, said robot comprising:
   means for setting a position at which work is performed,
   means for setting said works to be performed at said set positions,
   means for setting a sequence of movements between said set positions,
   control means for performing said works at said set positions in said sequence of movements,
   wherein said sequence of movements as being set is memorized as data indicating a next moving destination in connection with said set positions.

21. A robot performing a work at a set position, said robot comprising:
   means for setting a position at which work is performed,
   means for setting said works to be performed at said set positions,
   means for setting a sequence of movements between said set positions,
   control means for performing said works at said set positions in said sequence of movements,
   wherein said sequence of movements as being set is memorized as data arranged in the sequence thereof.

22. A robot performing a work at a set position, said robot comprising:
   means for setting a position at which work is performed,
   means for setting said work to be performed at said set position,
   control means for performing said work at said set position,
   means for setting positional error detection to be performed at said set position, said positional error detection being performed regarding a position between said set position and the position where said work is actually performed,
   means for setting amendment of position on the basis of the positional error which is detected at said set position.

23. The robot as defined in claim 22, wherein said amendment of position is made at the next position following the position where said positional error detection is made.

* * * * *